Patented Dec. 14, 1943

2,336,465

UNITED STATES PATENT OFFICE 2,336,465

QUATERNARY AMMONIUM COMPOUND

Johannes S. Buck, Bronxville, Laszlo Reiner, Mount Vernon, and Marion B. Sherwood, Yonkers, N. Y., assignors to Burroughs Wellcome & Co. (U. S. A.) Inc., New York, N. Y., a corporation of New York No Drawing. Application August 2, 1941, Serial No. 405,134

4 Claims. (Cl. 260—570.7)

This invention relates to preserving, disinfecting and chemotherapeutic compositions and more particularly to quaternary ammonium derivatives having the above characteristics, and has for an object to provide a novel and improved composition of the type above indicated.

Various other objects and advantages will be apparent as the nature of the invention is more fully disclosed.

This application is a continuation-in-part of our copending application 352,174, filed August 10, 1940, now abandoned.

Although the novel features which are believed to be characteristic of this invention are pointed out more particularly in the claims appended hereto, the invention may be better understood by referring to the following description in which a specific embodiment thereof has been set forth for purposes of illustration.

Many quaternary compounds are known to possess antiseptic or disinfecting properties to some degree. Compounds suitable for practical use, however, almost invariably contain, as an essential part, a long aliphatic chain. The inventors have now found that the disinfecting power of certain types of quaternary ammonium compounds, not containing a long aliphatic chain, but containing two short aliphatic groups and two aliphatically-bound aromatic radicals, and in themselves only of slight activity, can be greatly enhanced by the suitable introduction of halogen atoms so that many of the compounds become very effective disinfectants, showing high activity against widely varied organisms.

The compounds which embody the invention may be represented by the formula:

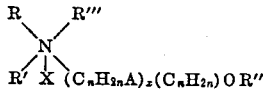

where R and R' represent lower alkyl groups of less than eight carbon atoms each, R'' represents a haloaryl or an alkylated haloaryl group, and R''' represents the radical

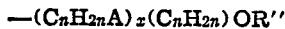

or a haloaryl group joined to the nitrogen atom by a short carbon chain. If desired the aromatic nuclei may be further substituted by effectively neutral groups such as the nitro group, the acyl-amino group, and so on. A represents sulfur or oxygen. $C_nH_{2n}$ represents short straight or branched alkylene groups, the total number of carbon atoms in these being less than eight. $x$ represents one or zero, and X is an anion such as the chloride, sulfate, bromide, acetate and citrate ions and the like.

As examples of compounds coming within scope of the invention, the following are cited:

4 - chlorocymoxyethoxyethyl - 4 - chlorobenzyldimethylammonium chloride
3 - methyl-4-chlorophenoxyethoxyethyl-4-chlorobenzyldiethylammonium chloride
4 - chlorocymoxyethoxyethyl - (4 - chloro - α - naphthylmethyl) dimethylammonium chloride
4 - chlorophenoxyethoxyethyl - 4 - chlorobenzyldimethylammonium sulfate
4 - chlorocymoxyethoxyethyl - 4 - bromobenzylmethylbutylammonium acetate
4 - chlorocymoxyethoxyethyl—(3-chloro-4-methoxyphenethyl) dimethylammonium phosphate
4-chlorocymoxyethylmercaptoethyl-4-chlorobenzyldimethylammonium chloride
4-chlorocymoxyisopropoxyisopropyl-4-chlorobenzyldimethylammonium chloride
Di - (4 - chlorophenoxyethoxyethyl) dimethylammonium chloride
Di-(4-chlorocymoxyethoxyethyl) dimethylammonium chloride
2-chlorophenoxyethyl - 2 - chlorobenzylethylpropylammonium citrate
4-chlorocymoxyethoxyethyl-4-chlorophenoxyethyldimethylammonium iodide
3 - chlorophenoxypropyl-4-bromophenethyldiethylammonium bromide
4-chlorobenzyloxyethyl - (3 - bromo - 4 - methoxybenzyl) dimethylammonium bromide
3 - chloro-4-acetophenoxyethoxyethyl-(4-bromo-3-methylbenzyl) dimethylammonium bromide
4-chlorophenoxyethoxyethyl—(4-chloro-α-naphthylmethyl) dimethylammonium chloride
2,4 - dibromophenoxyethoxyethyl - (4 - chloro - α - naphthylmethyl) dimethylammonium chloride
2 - chloro - α - naphthoxyethyl-(4-chloro-α-naphthylmethyl) dimethylammonium chloride
2,4-dibromo - α - naphthoxyethoxyethyl-4-bromobenzyldimethylammonium bromide
2 - nitro - 4 - chlorophenoxyethoxyethyl-2-chlorobenzyldimethylammonium chloride
4 - chlorophenoxyethoxyethyl - 2 - acetamino - 4 - chlorobenzyldimethylammonium chloride
4-chlorocymoxypropyl - 4 - bromobenzyldimethylammonium bromide
Di - (4 - chlorocymoxypropyl) dimethylammonium bromide
4-chlorocymoxyethyl-2-chlorobenzyldimethylammonium bromide
4 - chlorocymoxyethoxyethyl - 4 - chlorobenzyldimethylammonium sulfate 3 - methyl-4-chlorophenoxyethoxyethyl-4-chlorobenzyldiethylammonium sulfate
4-chlorocymoxyethoxyethyl-(4 - chloro - α - naphthylmethyl) dimethylammonium sulfate
4 - chlorocymoxyethoxyethyl - 4 - chlorobenzyldimethylammonium bromide
3 - methyl-4-chlorophenoxyethoxyethyl-4-chlorobenzyldiethylammonium bromide
4-chlorocymoxyethoxyethyl-(4 - chloro - α - naphthylmethyl) dimethylammonium bromide The compounds which are the object of this invention may be prepared by known methods. Thus, R″O($C_nH_{2n}$)(A$C_nH_{2n}$)$_x$—Cl may be condensed with NHRR′, and the amine

obtained by basifying the product, then reacted with R‴Cl. Alternatively,

may be reacted with the tertiary amine NRR′R‴ to give the quaternary salt directly. Other variants will be obvious.

*Example 1*

As an example of one embodiment of the present process 28.6 gm. (0.2 mol) β-β′-dichlorodiethylether, dissolved in 100 cc. absolute alcohol, was heated under a reflux condenser. A solution of 4-chlorothymol in 100 cc. absolute alcohol, in which 4.6 gm. (0.2 atom) sodium had previously been dissolved was then added slowly and the whole refluxed for 3 hours. After removing the condenser, most of the alcohol was evaporated, water added, and the oil extracted with ether. After drying, the ether was evaporated leaving a slightly yellow oil, which was used without further purification, for the next stage.

The above crude 4-chlorocymoxyethoxyethyl chloride, together with 3 mols of a 33% solution of dimethylamine in methanol, was sealed in glass bomb tubes and heated at 125° C. for 7 hours. When cold, the tubes were opened and the contents heated on the steam bath to drive off excess methanol and dimethylamine. The residual oil was made acid with dilute hydrochloric acid and the whole was extracted with ether. After making the aqueous layer strongly alkaline, the resulting oil was extracted with ether; the ether layer dried over solid potassium hydroxide, and the ether then evaporated, leaving the amine.

4.5 gm. of the above-obtained 4-chlorocymoxyethoxyethyldimethylamine, dissolved in ether, was treated with 2.4 gm. 4-chlorobenzyl chloride, also dissolved in ether. The solution was heated on the water bath, allowing the ether to boil off. After some hours a stiff glass was formed. Sometimes this spontaneously crystallizes, but in any event the product may be purified by recrystallization from acetone, when it forms bulky white nodular crystals, melting at about 160° C. and giving the correct analytical figures for 4-chlorocymoxyethoxyethyl-4 - chlorobenzyldimethylammonium chloride.

*Example 2*

2-chloro-5-hydroxytoluene is condensed with β-β′-dichlorodiethylether, in the presence of sodium hydroxide, by known methods. The resulting 3-methyl-4-chlorophenoxyethoxyethyl chloride is then condensed with diethylamine, in alcoholic solution at 140° C.–145° C. After isolating the resulting 3-methyl-4 - chlorophenoxyethoxyethyldiethylamine, it is condensed with 4-chlorobenzyl chloride, to give 3-methyl-4-chlorophenoxyethoxyethyl - 4 - chlorobenzyldiethylammonium chloride, which forms a gum or glass.

*Example 3*

4-chlorocymoxyethoxyethyldimethylamine may be condensed with 4-chloro-α-naphthylmethyl chloride by heating at 100° C. The resulting 4-chlorocymoxyethoxyethyl - (4 - chloro - α - naphthylmethyl) dimethylammonium chloride forms a stiff gum.

*Example 4*

In an analogous manner, 4-chlorocymoxypropyl - 4 - bromobenzyldimethylammonium bromide may be prepared by reacting 4-chlorocymoxypropyldimethylamine with 4-bromobenzyl bromide, or the same compound may be made by reacting 4-chlorocymoxypropyl bromide with 4-bromobenzyldimethylamine.

*Example 5*

By reacting 4-chlorocymoxypropyldimethylamine with 4-chlorocymoxypropyl bromide, by a method analogous to that described above, there is obtained di-(4-chlorocymoxypropyl) dimethylammonium bromide. In a similar manner, di-(4 - chlorophenoxyethoxyethyl) dimethylammonium chloride may be prepared from 4-chlorophenoxyethoxyethyl chloride and 4-chlorophenoxyethoxyethyldimethylamine.

*Example 6*

The reaction of 4-chlorocymoxyethyldimethylamine with 2-chlorobenzyl bromide gives as a product 4-chlorocymoxyethyl - 2 - chlorobenzyldimethylammonium bromide, which may also be prepared by reacting 4-chlorocymoxyethyl bromide with 2-chlorobenzyldimethylamine.

Many other examples could be given but it is evident that, apart from chemical variations obvious to one skilled in the art, the examples would be analogous to the foregoing.

The methods and examples cited are not to be taken as delimiting the invention but are merely illustrative.

Many of the compounds are crystalline solids, but some are oils or glasses as yet not obtained in the crystalline state. Some may be caused to combine with suitable metallic salts, to give double or molecular compounds of improved physical properties. The compounds of this invention are mostly soluble in water and furnish solutions which on account of their high antiseptic properties are very suitable for various disinfecting and preserving purposes. Among these purposes may be mentioned the disinfection of instruments and utensils, the preservation of biological fluids, pharmaceutical preparations, and the like. They may also be used in antiseptic lotions and as a general disinfectant. Other similar uses will be obvious.

The quaternary ammonium salts described in this invention may be used in substance as well as in solution or emulsion or suspension, or in admixture with each other. They may be also used as mixtures, emulsions, suspensions or solutions with other active or inert substances, and as molecular or double compounds with suitable metallic salts.

It is understood that the compounds referred to as preserving and disinfecting media may also be used for chemotherapeutic purposes and the term preserving and disinfecting media is to be interpreted as including such chemotherapeutic uses.

What is claimed is:

1. A quaternary ammonium compound having the formula

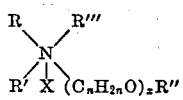

where R and R' are lower alkyl groups of less than 8 carbon atoms each; R'' is selected from the group consisting of haloaryl and alkylated haloaryl radicals; R''' is a haloaryl radical joined to the nitrogen atom by a short carbon chain; $x$ represents the numbers 1 to 3; $n$ represents the numbers one to four inclusive; X is an anion.

2. A salt of 4-chlorocymoxyethoxyethyl- 4-chlorobenzyldimethylammonium.

3. A salt of 3-methyl-4-chlorophenoxyethoxyethyl-4-chlorobenzyldiethylammonium.

4. A salt of 4-chlorocymoxyethoxyethyl-(4-chloro - α - naphthylmethyl) dimethylammonium.

JOHANNES S. BUCK.
LASZLO REINER.
MARION B. SHERWOOD.